6598X
2 Sheets Sheet 1
J. McKinney,
Cradle.
Patented June 13, 1831.
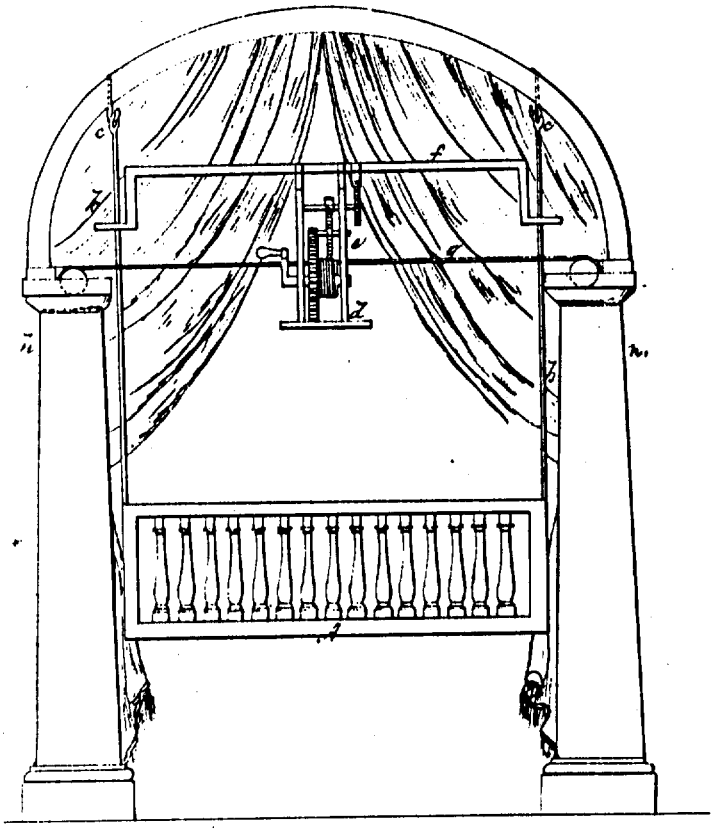
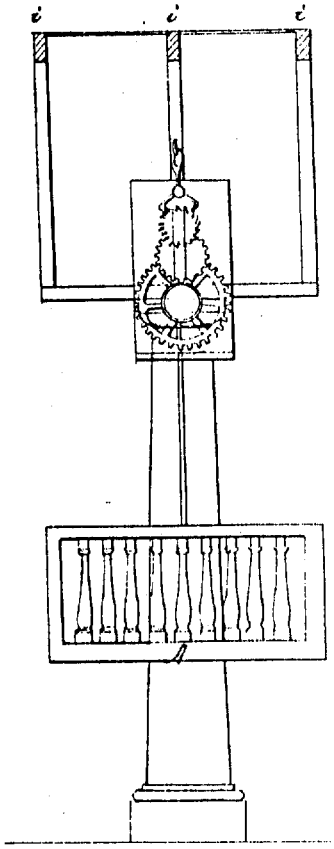

6598x
2 Sheets-Sheet 2
J. McKinney,
Cradle.
Patented June 13, 1831.
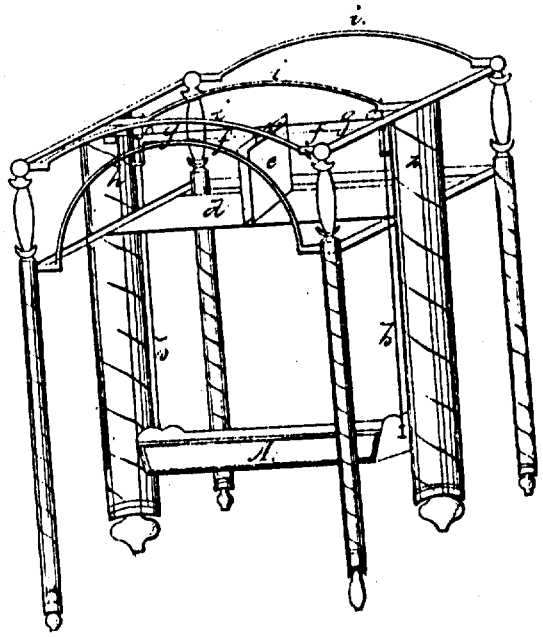

X0006598 June 13. 1831

John McKinney, Chester Ohio

Letters Patent

The Schedule referred to in these Letters Patent and making part of the same
containing a description in the words of the said John McKinney himself of his
Improvement in the application of the power of the pendulum clock to a Machine called a
Swinging Cradle.

To all to whom these presents shall come Be it known that I John McKinney
of Chester in the County of Butler and State of Ohio have invented a new
and useful improvement in the application of the power of the pendulum Clock
to a Machine called a Swinging Cradle and that the following is a full and exact
description of the construction and operation of the said Machine as invented
by me. A is the cradle swinging as a pendulum weight b. b are the pendulum
wires of [illegible] by which the cradle is suspended c c are pivot hooks in the
middle arch to which the pendulum wires are attached by loops on the ends
of the wires d. platform on which the box is set that contains the wheels e
box containing the wheels f f axle of the pallet [illegible] with cranks at each
end by which the power is applied g g. cords from the barrel of the main wheel
to which the weights are attached passing over pulleys to the centre posts down
which the weights pass thro' a cavity of 3 inches diameter h. h. centre posts 6
inches diameter with a cavity of 3 inches diameter down which the weights pass
i i. arches running lengthwise to support a tester.

This piece of furniture (the swinging cradle) may
be made in various forms to suit the fancy of individuals. The form here prescribed
is that of a fancy bedstead — the height is four feet — the length two feet eight inches
the width one foot eight inches supported by cross pieces framed into the posts
having in front an arch [illegible] for convenience and good appearance. The works
consist of three wheels the main wheel is cast iron 6 inches diameter containing
72 cogs with a barrel on the axle 3 inches diameter on which the weight cords
are wound. The axle of the wheel projects so as to receive a crank key such as is
used to wind an eight day clock the barrel being fixed on the axle in the same manner as that of the clock. The counter wheel is 4 inches diameter (of cast iron) containing 48 cogs with a pinion on the axle containing 12 cogs which receive the cogs of the main wheel. The crown wheel of brass 3 inches diameter with 24 teeth also having a pinion on its axle containing 8 cogs which receive the cogs of the crown wheel. The axle of the wheels are 2 1/2 inches in length from shoulder to shoulder and of sufficient strength to receive the power. The axle to which the pallets or verge is attached should be of cast steel 5 inches long and 1/2 inch diameter. On the ends of this axle are the cranks which ply on the wires by which the cradle is suspended. The weight attached to each cord is 10 pounds. The whole machine is on the principle of the pendulum clock with this difference only that it is composed of three wheels instead of a greater number.

The pallet or verge of a suitable size to escape one 7 teeth at any vibration. What I claim as new and as my own invention or discovery in the above described machine and for the use of which I ask an exclusive privilege is the application of the power of the pendulum clock to that purpose.

Exd. MC

Witnesses
James Heaton
Jacob Deardorff

John McKinney

[704 [illegible]]